July 5, 1949.  E. M. PETERSEN  2,475,250
RUNNER VEHICLE
Filed Sept. 28, 1944  4 Sheets-Sheet 2
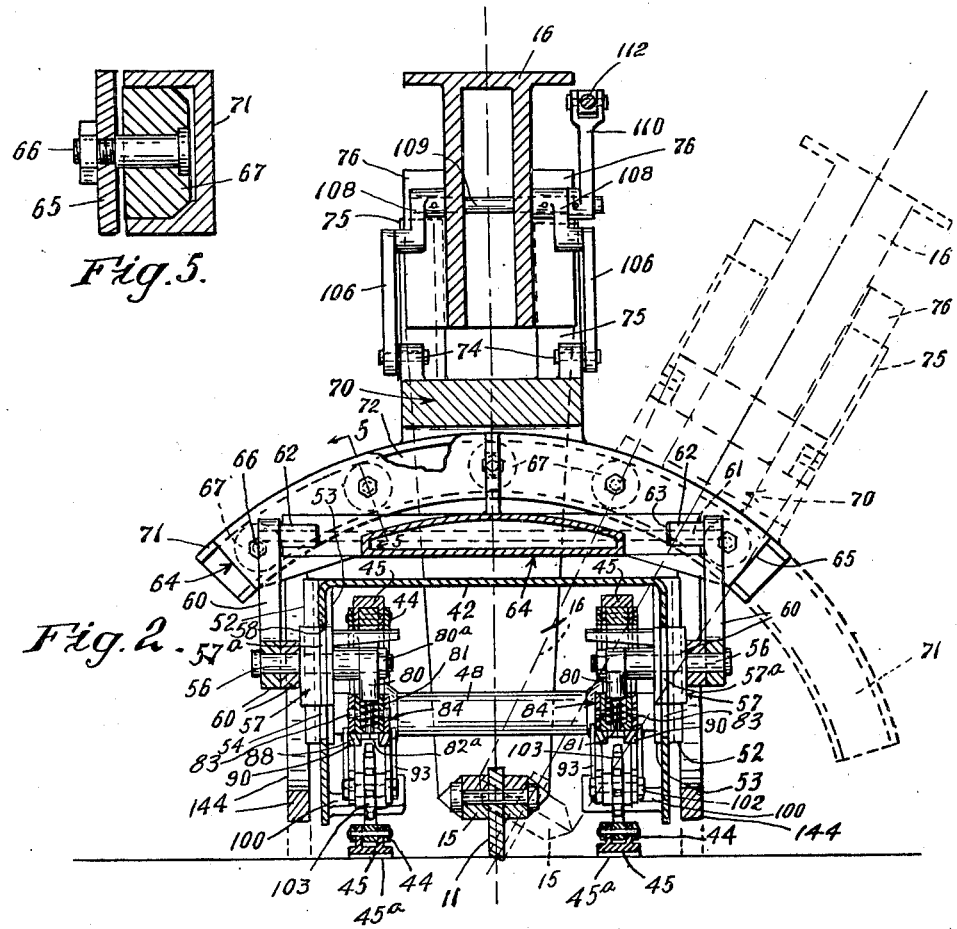
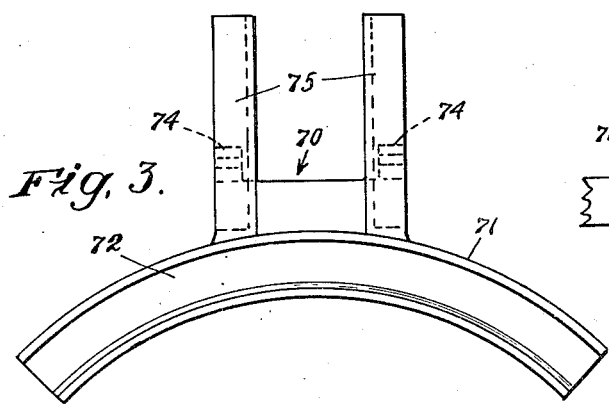
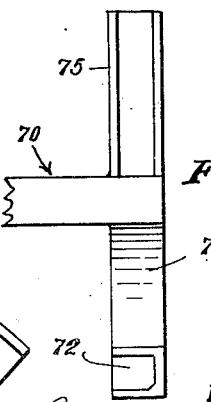
INVENTOR.
Egon M. Petersen
BY Harold E. Cole
Attorney July 5, 1949.　　　　E. M. PETERSEN　　　　2,475,250
RUNNER VEHICLE
Filed Sept. 28, 1944　　　　　　　　　　　4 Sheets-Sheet 3
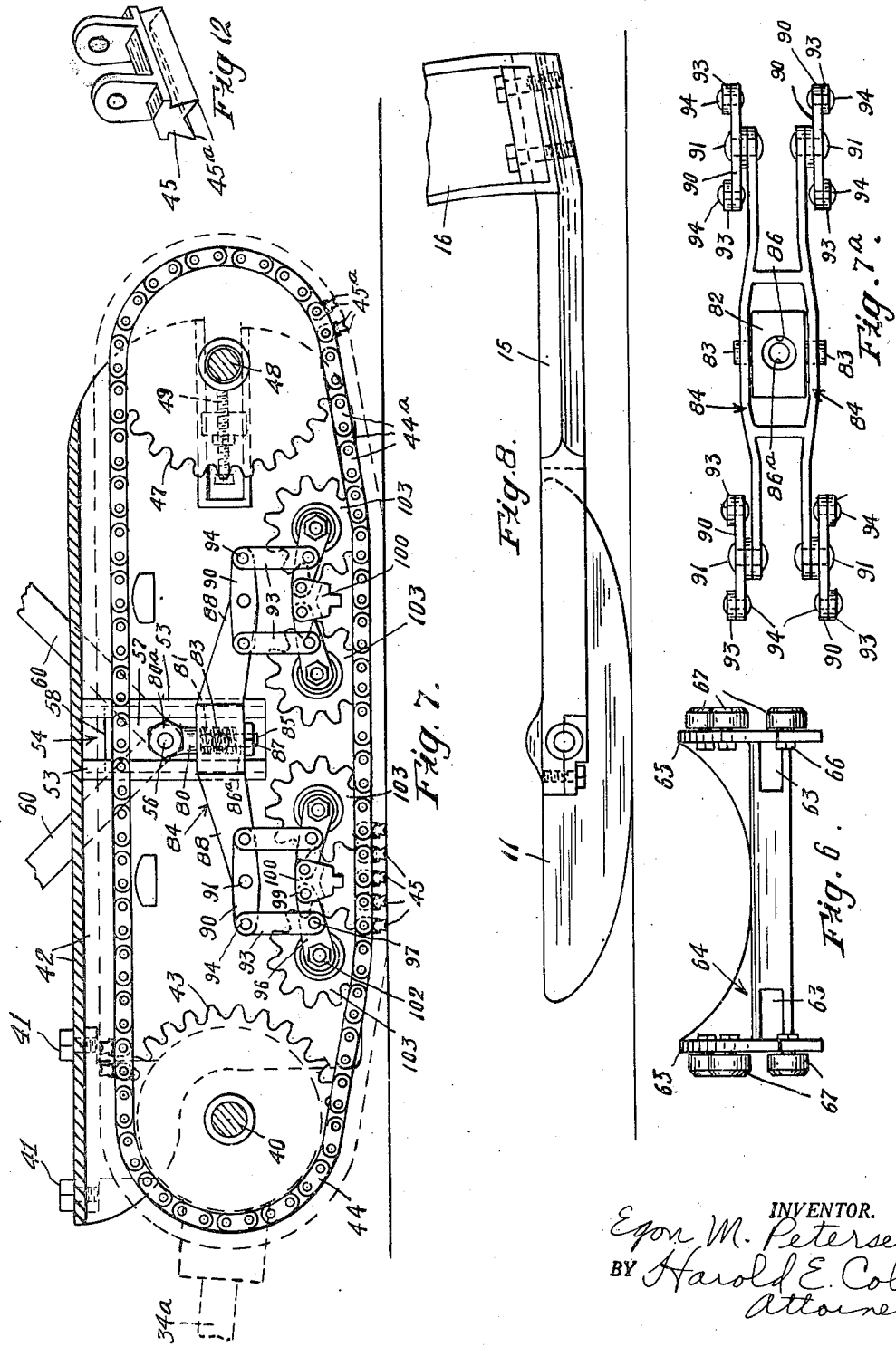
INVENTOR.
Egon M. Petersen
BY Harold E. Cole
Attorney July 5, 1949.  E. M. PETERSEN  2,475,250
RUNNER VEHICLE
Filed Sept. 28, 1944  4 Sheets-Sheet 4
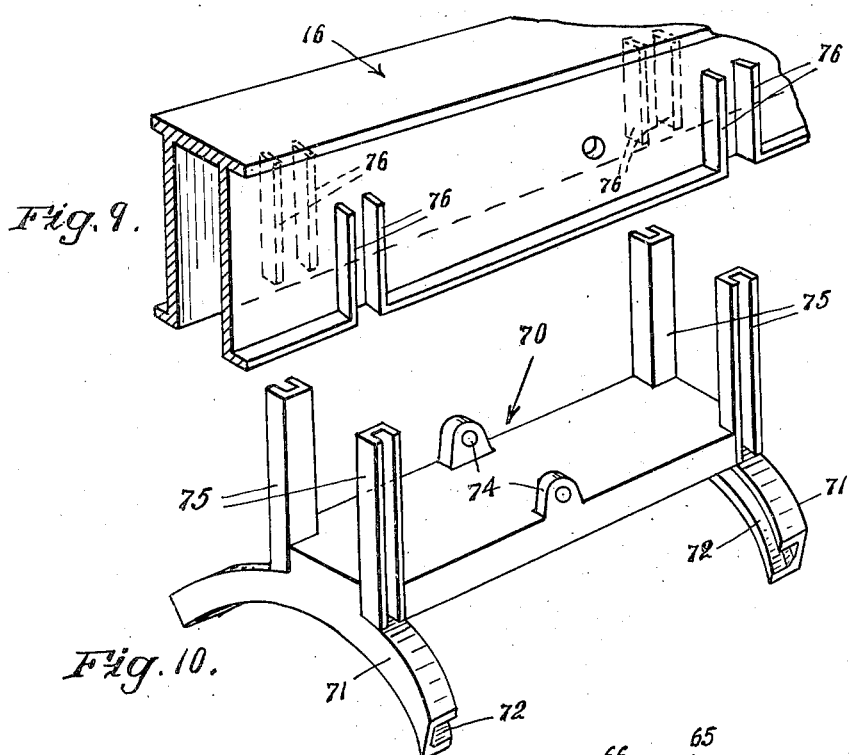
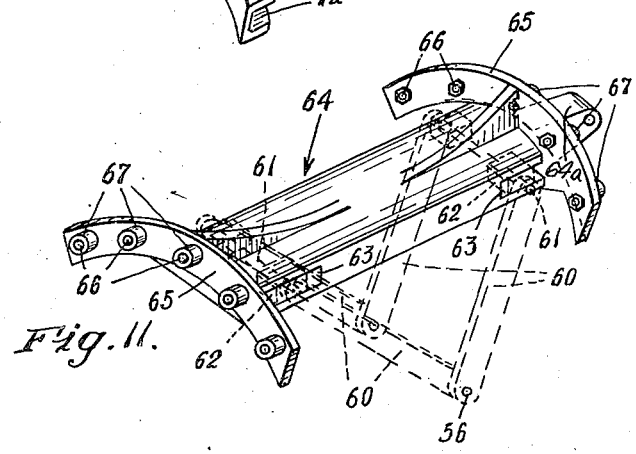
INVENTOR.
Egon M. Petersen
BY Harold E. Cole
Attorney Patented July 5, 1949

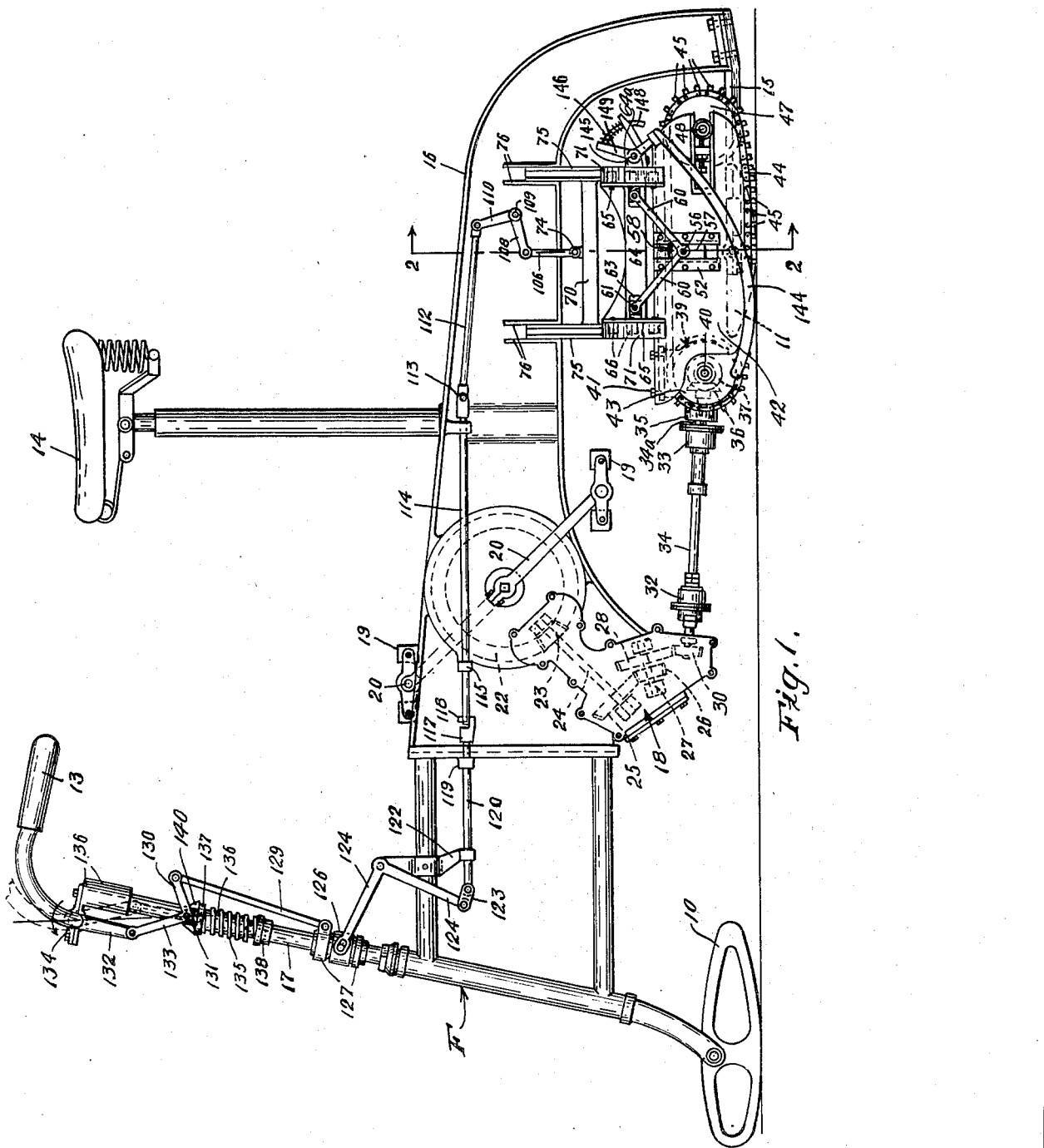

2,475,250

UNITED STATES PATENT OFFICE 2,475,250

RUNNER VEHICLE

Egon M. Petersen, Cambridge, Mass.

Application September 28, 1944, Serial No. 556,135

13 Claims. (Cl. 280—12.10)

1

This invention relates to a runner vehicle to travel on snow and ice.

One object of my invention is to so construct the crawler drive and its mounting to the frame that when the vehicle frame is tipped or inclined, as when making a turn, the crawler treads will be unaffected and thus will continue to lie flat on the traveled surface as it moves along. This maintains the traction effect without diminution of its efficiency as the vehicle is steered to the left or right or an angle of inclination of the vehicle frame is otherwise caused.

Another object of my invention is to provide convenient mechanism to raise the crawler tread from contact with the traveled surface, as when it is desired to coast.

Still another object is to so attach the crawler drive to the vehicle frame that the frame and runners bear the weight of the assembly and rider.

A further object is to provide structure that permits the crawler drive to instantaneously move vertically when it encounters obstacles or the like on the traveled surface that tend to force it upwardly.

Figure 1 is a side elevational view of my vehicle with runners and crawler drive.

Figure 2 is a sectional view taken on the line 2—2 of Figure 1.

Figure 3 is a front end view of the arcuate oscillating member that serves to permit my vehicle to tilt without tilting the crawler drive.

Figure 4 is a side elevational view, broken away, of said oscillating member.

Figure 5 is a sectional view taken on the line 5—5 of Figure 2.

Figure 6 is a side elevational view of the roller guide member for said oscillating member.

Figure 7 is a longitudinal sectional view of my crawler drive.

Figure 7a is a plan, detail view of arm members and connected parts that permit vertical movement of the crawler tread on an uneven traveled surface.

Figure 8 is a side-elevational view of the rear runner and its supporting member.

Figure 9 is a perspective view, partly in section of the main frame extension of my ice vehicle in which the oscillating member movably fits.

Figure 10 is a perspective view of my oscillating member.

Figure 11 is a perspective view of my arcuate roller guide member.

Figure 12 is a perspective view of a gripping

2 dog attached to a link pin of the crawler tread showing gripping edges.

As illustrated my sliding vehicle has a main frame F to which is attached a front, centrally pivoted runner 10 and a rear, centrally pivoted runner 11, also handle bars 13 and a seat 14. The rear runner 11 contacts the traveled surface at the center of the crawler drive. The main frame F has a rear extension 16 which is a support for my crawler drive mechanism. It also has a steering post 17. Said runners 10 and 11 support said frame F. A supporting arm 15 is pivoted at one end to said runner 11 and is fixed to said frame extension 16.

My vehicle is equipped with the usual propelling mechanism 18, pedals 19 attached to crank arms 20, which are attached to a drive gear 22. A pinion 23 meshes with said drive gear 22, and a shaft 24 is fixed thereto. A gear 25 is fixed to said shaft 24 and a pinion 26 meshes therewith, said pinion 26 being fixed to a stud shaft 27, to which a gear 28 is fixed. A pinion 30 meshes with said gear 28 and a universal joint 32 connects said pinion 30 to a drive shaft 34 which shaft has a universal joint 33 connected to it and from which joint a stub shaft 34a extends through a journal 35 and has a bevel gear 36 attached to it that is rotated by said stub shaft 34a and meshes with another bevel gear 37 that is operatively associated with a well known coaster brake mechanism in a housing 39 that is attached by bolts 41 to a crawler frame 42. Said journal 35 is part of said coaster brake mechanism housing.

Said gear 37 is adapted to rotate a coaster brake shaft 40 when the propelling mechanism 18 is in operation, which shaft 40 is the drive shaft for the crawler treads and is supported by a crawler frame 42 through the housing 39 of said coaster brake mechanism.

Since said drive shaft 34 has universal joints 32 and 33 it is quite flexible in operation and thereby transmits power to said shaft 40 when said frame F oscillates.

Front sprockets 43 are fixed to said drive shaft 40, and engaging with each said sprocket 43 is a revolving chain or tread 44 having dogs or grippers 45 pivotally fastened to links 44a of said treads 44, having gripping edges 45a extending crosswise of said treads. Rear sprockets 47 engage with said treads 44 and are mounted on a shaft 48 supported by said frame 42. A sprocket adjustment 49 for each said sprocket 47 is of the usual construction.

Two guideways 52 are fixed to the outside of said frame 42 at opposite sides, and two other opposite guideways 53 are fixed to the inside thereof, there being spaces 54 left between each pair of guideways 52 and 53. Parts of said frame 42 extend into said spaces 54 and said guideways 52 and 53 are fixed thereto. A block 57 is between each of said two pairs of guideways 52 and 53 and it has ribs 57a that hold said block in said spaces 54. Supporting rods 56 are fixed to and extend through said blocks 57.

To permit a vertical movement of my crawler drive so that it may accommodate itself to unevenness or obstacles encountered on the ice, snow or other traveled surface, I provide two pairs of links 60 that extend diagonally and are pivotally connected by said supporting rods 56. The upper ends of said links 60 are rigidly connected to rods 61 and are pivotally connected to sliding blocks 62 forming part of a roller guide member 64. Said roller guide member 64 is provided with slots 63 to permit slight movement of said rods 61 horizontally. Said frame 42 is movable upwardly and downwardly with respect to said guide member 64. Links 60, blocks 57 and guideways 52 maintain said crawler frame 42 in longitudinal driving alinement with guide member 64 and thereby with main frame F while permitting movement of said frame 42.

When traction is applied to tread 44, forward links 60 are automatically moved forward until forward sliding blocks 62 reach the forward end of horizontal slot 63. This action makes it possible to transmit forward motion to vehicle frame F while at the same time transmitting downward pressure (or tractive effort) to tread 44 through rods 56, slide blocks 57, rods 80 and links 84, 90, 93 and 96 to sprockets 103. When braking action is applied to tread 44, rear links 60 are automatically moved toward the rear until rear sliding blocks 62 reach the rear end of horizontal slots 63. This transmits downward pressure to tread 44, through rods 56, slide blocks 57, rods 80 and links 84, 90, 93 and 96 to sprockets 103. When traction is being applied through forward links 60, rear links just slide idly in slots 63 and when braking is being applied through rear links 60, forward links just slide idly in slots 63. These links 60 also make it possible to lift the crawler mechanism, including fame 42, off traveled surface by contracting until sliding blocks 62 reach inner portions of slots 63 and crawler mechanism is lifted through rods 56. When said stops 58 are engaged with said blocks 57 the said frame 42 is supported in a position permitting free and unimpeded travel of said crawler treads 44.

Said roller guide member 64 has arcuate ends 65 on which rollers 67 are rotatably mounted by pins 66.

An oscillating member 70, which oscillates or slides on said rollers 67, has arcuate ends 71 which have channels 72 therein. Said oscillator 70 by means of said oscillator ends 71 slides on said rollers 67 whenever the vehicle frame tips or inclines while riding as when turning a corner; but without tipping the crawler tread 44. The roller guide member 64 permits the oscillator 70 to slide or oscillate as the vehicle frame tips or inclines; but it does not tip itself, thus maintaining effective and uniform traction of the caterpillar treads upon the ice or other traveled surface. Lugs 74, to aid in lifting the crawler drive, are integral with said oscillator 70.

Extending upwardly from said oscillator ends 71 are posts 75 which telescopically slide in guideways 76 which are integral with said frame extension 16. Since there must be some vertical movement of said oscillator member 70 said posts 75 and guideways 76 permit it.

Two connecting rods 80 are fixed to rods 56, the latter rods 56 extending through said blocks 57 and rigidly through said rods 80, nuts 80a holding said rods 80 to said rods 56. Around the lower ends of said rods 80 are coil springs 81. Blocks 82 are slidably attached to lower ends 85 of said rods 80, being held by nuts 82a. Two studs 83 extend from each said block 82 and extend through said arm members 84. Said blocks 82 are welded and therefore rigidly connected to arm members 84 as at 83a, thus said arms 84 are maintained paralled to crawler tread frame 42. Said blocks 82 each have a hole 86 therein which are smaller in diameter as at 86a at their lower end to provide shoulder supports above them for said springs 81. Said rod lower ends 85 extend through said smaller holes 86a, and nuts 87 hold said rods 80 loosely in place.

Said arm members 84 have extension pieces 88 to which links 90 are connected by pivot pins 91. To each link 90 a pair of vertical links 93 are pivoted as at 94. Said links 93 extend to sprocket supporting links 96 which are pivotally connected thereto as at 97. Said links 96 are pivotally connected as at 99 to lugs 100 which are part of said crawler frame 42. Shafts 102 are pivotally connected to said links 96 and mounted on said shafts 102 are sprocket gears 103 with which said treads 44 mesh. Said arm members 84 and other connecting parts down to said crawler treads 44 permit vertical movement of my crawler tread when it runs over rough places or obstacles on the traveled surface.

Two links 106 on opposite sides of said crawler drive are pivotally fastened to said oscillating member lugs 74 and to two levers 108. A rod 109, which is rotatably mounted in said frame rear extension 16, is fixed to and extends between said levers 108. A single link 110 is fixed to said rod 109, and pivotally connected to said link 110 is a rod 112 which connects to a pivoting member 113 to allow some movement. From said pivoting member 113 another rod 114 extends to a bearing 115 which is on said vehicle frame F.

Mounted on said rod 114 by a pin 118 is a holder 117. Another rod 120 extends from said holder 117 through a bearing 119 that is fastened to said frame F. Said rod 120 extends through another bearing 122 which is fixed to said frame F. A short link 123 is pivotally fastened to said rod 120 and also pivotally fastened to a double lever 124 which lever is pivotally attached at an intermediate point to an extension of said bearing 122.

One arm of said lever 124 is pivoted to a collar 126 which is rotatably mounted on a slide 127 which is vertically slidable on and mounted on said steering post 17. An arm 129 is pivotally attached to said slide 127 and to a lower arm 130 of a bell crank lever which is pivoted at 131 to a sliding collar 137 later described. Said handle bars 13 have an integral extension member 132 which is pivotally attached to the upper arm 133 of said bell crank lever.

Said handle bars and extension member 132 are pivoted as at 134 to a support 136 that is an offset of said steering post 17. This pivot 134 permits an arcuate movement of said handle bars to thereby raise the crawler drive off the traveled surface as when coasting through the aforementioned linkage and parts. During the upward rotative movement of said handle bars said upper arm 133 rotates on said pivot 131 until the center line between said pivot 131 and pivot 134 is crossed which forces the pivot point 131 downwardly slightly to thereby force said sliding collar 137 harder against a coil spring 135 which normally is partially compressed. Said spring extends around a sleeve 136 that is slidable on said steering post 17, said sleeve being a part of said collar 137. The lower end of said spring 135 bears against a stop member 138 fixed to said steering post 17.

When said center line is crossed during the upward movement of said handle bars said spring 135 is gradually released until it exerts only slight pressure upwardly on said collar 137. When said handle bars are rotated downwardly the compression on said spring is gradually increased and then released as in above operation and the parts return to their normal position.

Integral with said post 17 are two stops 140 against which the top of said collar 137 bears. Said stops limit the travel of said collar 137 so that when said handle bars have been rotated to lifting position upwardly, or downwardly therefrom to normal position, said stops 140 maintain said handle bars in either of said positions until sufficient pressure is applied to force said spring 135 downwardly.

I provide guide arms 144 for my crawler drive which arms extend downwardly, forwardly and slightly outward on each side of said crawler drive. They are rigidly pivoted through shafts 145 at their upper end, which shafts are pivotally mounted to an end extension 64a of said roller guide member 64. Said extension 64a is below said arcuate ends 65 and said arms 144 are under the tension of springs 146 extending around arcuate pins 148 which are secured to levers 149 that are integral with said arms 144. The lower ends of said guide arms 144 contact the traveled surface adjacent the point where the front end of the crawler treads contact said surface. Said guide arms 144 serve to absorb the twisting torque from the drive shaft 40, and relieve the strain on the crawler treads when making turns or otherwise changing the direction of travel. These arms 144 also keep the treads in proper position when my vehicle is free-coasting and the crawler treads are off the traveled surface, thus keeping said treads properly positioned for instantaneous engagement with the traveled surface.

While my vehicle has a free-coasting arrangement when the crawler drive is raised from contact with the traveled surface, the coaster brake also enables coasting with the crawler drive in contact with the traveled surface.

What I claim is:

1. A runner vehicle comprising a main frame embodying a steering post, said steering post having an offset portion, runners attached to said main frame, means to propel said vehicle operatively attached to said main frame, handle bars adapted to be raised rotatably mounted in said offset portion, a crawler drive adapted to be raised operatively connected to said propelling means and to said main frame, and lifting mechanism operatively connected to said crawler drive and said handle bars whereby when said handle bars are raised said crawler drive is raised.

2. A runner vehicle comprising a main frame, front and rear runners attached to said main frame, means to propel said vehicle operatively attached to said main frame, a crawler drive operatively connected to said propelling means and embodying a supporting frame, an arcuate-shaped oscillator member associated with said main frame and movable laterally therewith, arcuate-shaped guideway means on which said oscillator member oscillates, and means connecting said guideway with said crawler frame; the longitudinal center line of said arcuate oscillator member and said arcuate guideway being directly above said rear runner when said vehicle is in normal position.

3. A runner vehicle comprising a main frame, front and rear runners attached to said main frame and being positioned directly below it, means to propel said vehicle operatively attached to said main frame, a crawler drive operatively connected to said propelling means and embodying a supporting frame, an arcuate-shaped oscillator member associated with said main frame and movable laterally therewith, arcuate-shaped guideway means below said member embodying rollers on which said oscillator member oscillates, means connecting said guideway with said crawler supporting frame, the longitudinal axial line of said oscillator member and said guideway being in vertical alinement with said rear runner when said vehicle is in normal position.

4. A runner vehicle comprising a main frame, a front runner, a rear runner directly below said main frame, said runners being attached to said frame, means to propel said vehicle operatively attached to said main frame, a crawler drive operatively connected to said propelling means and embodying a supporting frame, an arcuate-shaped oscillator member associated with said main frame and movable laterally therewith, guideway means below said oscillator member on which the latter oscillates, means connecting said guideway with said supporting frame, the axis of oscillation for said oscillator member in said guideway means being substantially coincident with the bottom of said runners.

5. A runner vehicle comprising a main frame, front and rear runners, attached to said main frame, means to propel said vehicle operatively attached to said main frame, a crawler drive operatively connected to said propelling means and embodying a supporting frame, an oscillator member between a portion of said main frame portion and one of said runners that can oscillate with respect to said crawler frame and is connected with said main frame and is oscillable laterally therewith, guideway means in operative association with and on which said oscillator member oscillates, and means connecting said guideway means with said crawler frame.

6. A runner vehicle comprising a main frame, front and rear runners attached to said main frame, means to propel said vehicle operatively attached to said main frame, a crawler drive operatively connected to said propelling means and embodying a supporting frame, an oscillator member between a said main frame portion and a said runner that can oscillate with respect to said crawler frame and is connected with said main frame and is oscillable laterally therewith, guideway means in operative association with said oscillator member and embodying rollers on which said oscillator member oscillates, and means connecting said guideway means with said crawler frame.

7. A runner vehicle comprising a main frame, front and rear runners attached to said main frame, means to propel said vehicle operatively attached to said main frame, a crawler drive operatively connected to said propelling means and embodying a supporting frame, an arcuate-shaped oscillator member between a said main frame portion and a said runner that can oscillate with respect to said crawler frame and is connected with said main frame and is oscillable laterally therewith, arcuate-shaped guideway means in operative association with and on which said oscillator member oscillates, and means connecting said guideway means with said crawler frame.

8. A runner vehicle comprising a main frame, front and rear runners attached to said main frame, means to propel said vehicle operatively attached to said main frame, a crawler drive operatively connected to said propelling means and embodying a supporting frame, an oscillator member between a said main frame portion and a said runner that can oscillate with respect to said crawler frame and is so connected with said main frame that it is oscillable laterally therewith, but can be lifted independently thereof, guideway means in operative association with and on which said oscillator member oscillates, and means connecting said guideway means with said crawler frame, and movable lifting mechanism operatively connected with said oscillator member and said crawler drive adapted upon actuation to lift said oscillator member and crawler drive.

9. A runner vehicle comprising a main frame, handle bars movably attached to said main frame, front and rear runners attached to said main frame, means to propel said vehicle operatively attached to said main frame, a crawler drive operatively connected to said propelling means and embodying a supporting frame, an oscillator member between a said main frame portion and a said runner that can oscillate with respect to said crawler frame and is so connected with said main frame that it is oscillable laterally therewith but can be lifted independently thereof, guideway means in operative association with and on which said oscillator member oscillates, and means connecting said guideway means with said crawler frame, and movable lifting mechanism operatively connected to said oscillator member and said crawler drive and to said handle bars whereby upon movement of said handle bars said crawler drive and oscillator member are lifted.

10. A runner vehicle comprising a main frame embodying a rear extension, front and rear runners attached to said main frame, means to propel said vehicle operatively attached to said main frame, a crawler drive operatively connected to said propelling means and embodying a supporting frame connected to said rear extension, an oscillator member between a portion of said main frame and a said runner that can oscillate with respect to said crawler frame and is connected with said main frame and is oscillable laterally therewith, guideway means in operative association with and on which said oscillator member oscillates, and means connecting said guideway means with said crawler frame.

11. A runner vehicle comprising a main frame, front and rear runners attached to said main frame, means to propel said vehicle operatively attached to said main frame, a crawler drive operatively connected to said propelling means and embodying a supporting frame, an oscillator member between a said main frame portion and a said runner that can oscillate with respect to said crawler frame and is connected with said main frame and is oscillable laterally therewith, vertically extending guideway means connected to said main frame, said oscillator member embodying a portion slidably extending into said vertical guideway means, guideway means in operative association with and on which said oscillator member oscillates, and means connecting said latter guideway means with said crawler frame.

12. A runner vehicle comprising a main frame, front and rear runners attached to said main frame, means to propel said vehicle operatively attached to said main frame, a crawler drive operatively connected to said propelling means and embodying a supporting frame, an oscillator member between a portion of said main frame and a said runner that can oscillate with respect to said crawler frame and is connected with said main frame and is oscillable laterally therewith, said oscillator member embodying upwardly extending posts, downwardly extending guideway means connected with said main frame in which said posts slidably extend, guideway means in operative association with and on which said oscillator member oscillates, and means connecting said latter guideway means with said crawler frame.

13. A runner vehicle comprising a main frame, front and rear runners attached to said main frame, means to propel said vehicle operatively attached to said main frame, a crawler drive embodying crawler treads on opposite sides of said rear runner, said drive being operatively connected to said propelling means and embodying a supporting frame, means connecting said propelling means and crawler drive in substantial alinement with said rear runner, an oscillator member between a said main frame portion and a said runner that can oscillate with respect to said crawler frame and is connected with said main frame and is oscillable laterally therewith, said oscillator member embodying upwardly extending posts, downwardly extending guideway means connected with said main frame in which said posts slidably extend, guideway means in operative association with and on which said oscillator member oscillates, and means connecting said latter guideway means with said crawler frame.

EGON M. PETERSEN.

REFERENCES CITED

The following references are of record in the file of this patent:

UNITED STATES PATENTS

| Number | Name | Date |
| --- | --- | --- |
| 387,814 | Ribble et al. | Aug. 14, 1888 |
| 508,980 | Roeber | Nov. 21, 1893 |
| 1,068,883 | Frank | July 29, 1913 |
| 1,280,988 | Grumme | Oct. 8, 1918 |
| 1,318,166 | Matheus | Oct. 7, 1919 |
| 1,696,125 | Rantasa | Dec. 18, 1928 |
| 2,339,886 | Shannon | Jan. 25, 1944 |

FOREIGN PATENTS

| Number | Country | Date |
| --- | --- | --- |
| 39,543 | Norway | Aug. 18, 1924 |